United States Patent [19]

Romero

[11] 4,428,586
[45] Jan. 31, 1984

[54] COMBINATION WEAR SLEEVE AND EXCLUDER LIP ADAPTED FOR EASY INSTALLATION

[75] Inventor: Richard A. Romero, Schaumburg, Ill.

[73] Assignee: Chicago Rawhide Manufacturing Company, Elgin, Ill.

[21] Appl. No.: 481,983

[22] Filed: Apr. 4, 1983

[51] Int. Cl.³ .................... F16J 15/32; F16J 15/34
[52] U.S. Cl. ............................ 277/25; 277/38; 277/50; 277/82; 277/153
[58] Field of Search .................... 277/25, 38–41, 277/50, 82, 84, 92, 95, 152, 153

[56] References Cited

U.S. PATENT DOCUMENTS

| | | | |
|---|---|---|---|
| 2,352,336 | 6/1944 | Martin et al. | 277/25 |
| 3,011,814 | 12/1961 | Rhoads et al. | 277/153 X |
| 3,207,521 | 9/1965 | Dega | 277/208 X |
| 3,479,728 | 11/1969 | Burfield et al. | 277/39 X |
| 3,511,513 | 5/1970 | Dahlheimer | 277/82 |

FOREIGN PATENT DOCUMENTS 2414634  10/1974  Fed. Rep. of Germany ...... 277/153

Primary Examiner—Robert S. Ward
Attorney, Agent, or Firm—James T. FitzGibbon

[57] ABSTRACT

A two component oil seal assembly including a combination oil seal and unitizing component having inner and outer cases, an oil seal having radial and axial flanges, and a centrifugally acting excluder unit which has an inside diameter adapted to be readily positioned over an associated shaft, an axially extending, generally cylindrical surface adapted to act as the wear surface or seal band engagement surface for the other component, and further including a radial flange having attached thereto an excluder seal adapted to engage a portion of the radial flange of the seal casing.

9 Claims, 8 Drawing Figures

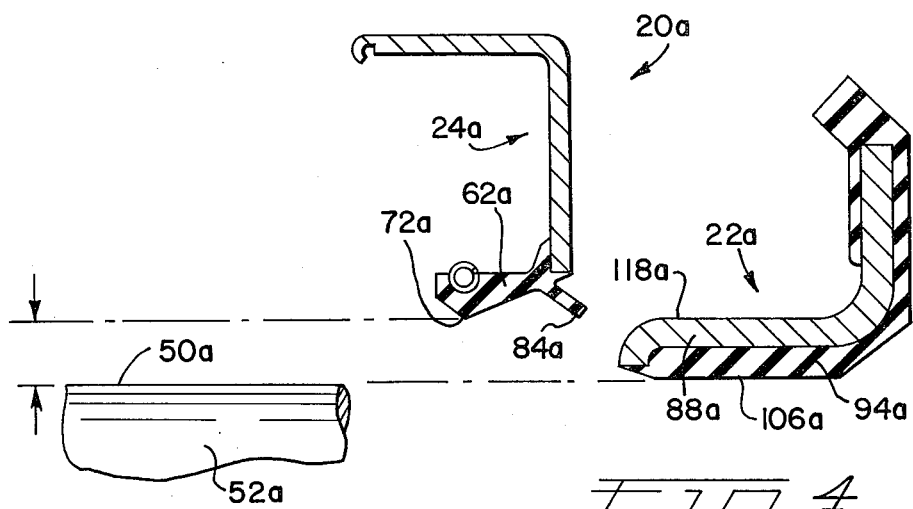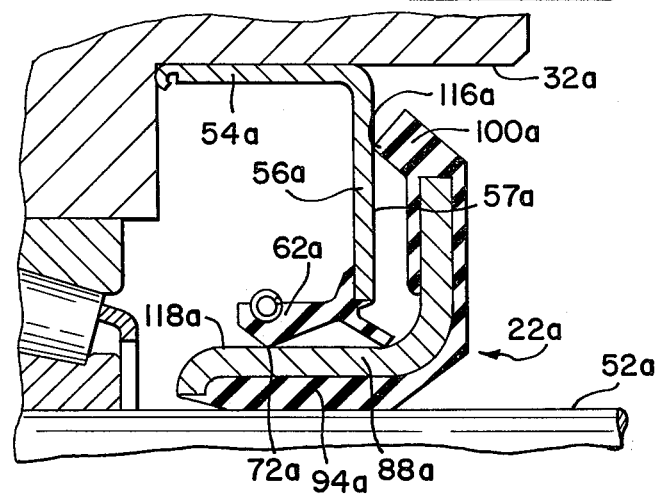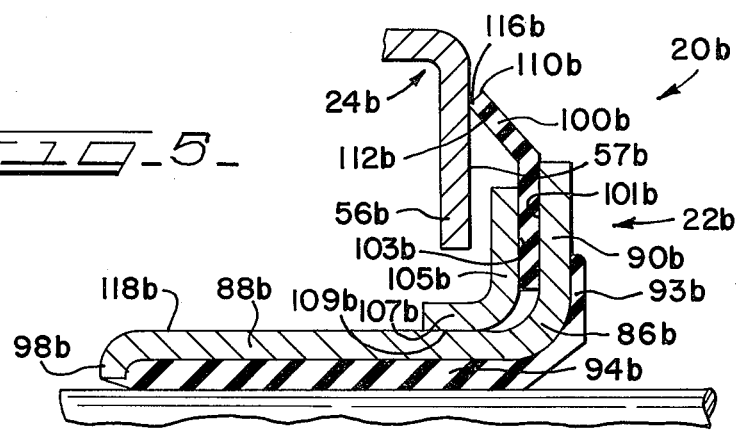

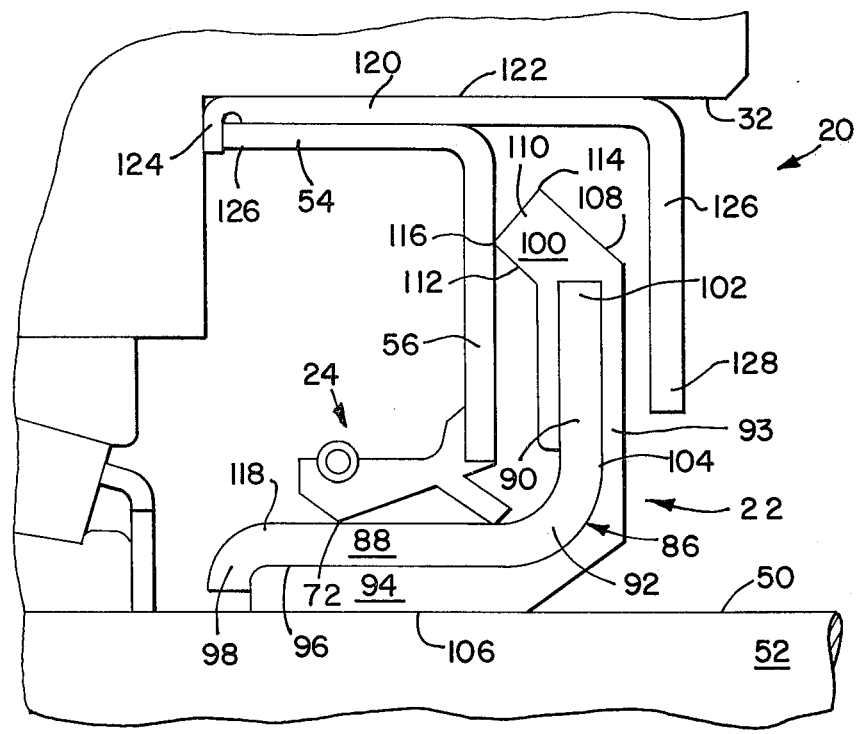
FIG_6_
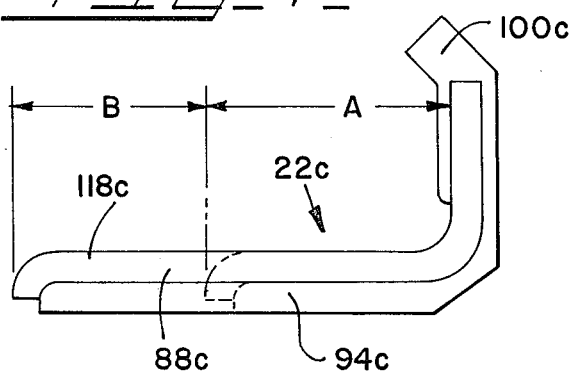
FIG_7_
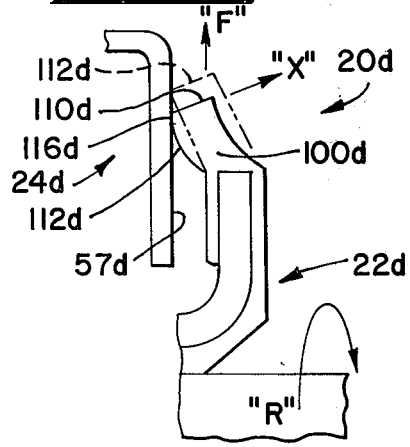
FIG_8_

COMBINATION WEAR SLEEVE AND EXCLUDER LIP ADAPTED FOR EASY INSTALLATION

The present invention relates generally to fluid sealing and in particular, to seals which are adapted to exclude dirt from the wearing surface regions of fluid seals such as oil and grease seals.

A great variety of oil and grease seals are available in the market for sealing applications, such as the sealing of automobile, truck and aircraft wheels, axle assemblies, transmission toil shafts, other automotive applications, including seals for transmissions, differentials, and crankshafts for example, as well as railroad journal boxes, form equipment applications and the like. In these seals, it is customary for a seal to comprise a single unit which includes a casing portion and an elastomeric seal lip body bonded to such casing portion.

The casing is adapted to fit within a counterbore or the like in a machine, while the seal lip is adapted to overlie and be urged into sealing engagement with an associated shaft by its own inherent resiliency, usually in combination with means such as a garter spring for applying a supplemental radial load.

In some cases, the seal is made as described above, except that the sealed material itself is a fluorocarbon, leather or other relatively lubricous material which is crimped or otherwise secured with respect to the casing element other than by bonding.

In certain cases, it is known that a so-called wear sleeve or the like may be urged over the end portion of a shaft, and in such a case, the radially inwardly acting elastomeric seal body has its seal band portion received over and sealingly engaging an axially extending, generally cylindrical portion of this wear sleeve instead of the shaft itself. The effect of this sealling action is the same as though the seal acted directly on the shaft, however.

In some case, the relative positions of the seals are reversed so that the seal casing seals on an inner diameter, and a primary seal lip acts radially outwardly on the inner diameter of a machine member or associated sleeve, for example.

While in most cases, the part with respect to which the casing holding the primary lip seal body is affixed is a stationary part, and the other machine element is the rotary part, it is known for the seal to be mounted on a rotary element. The reason this is not commonly done is that the seal body itself is then subject to centrifugal forces, changing its effective radial load as the speed of the rotary part begins movement and then operates within a variable speed range.

According to the present invention, it is possible to provide a wear sleeve which is readily fitted over an axial or like rotary member, and to have this unit further include a centrifugally acting excluder lip to keep dirt or other contaminants from entering the area of the primary seal body, which in turn includes a primary seal lip body having its own auxiliary or excluder lip.

According to the present invention, the rotary combination wear sleeve and excluder lip may be formed by bonding, crimping, or other assembly method. The excluder may be adapted to be received over a shaft and to fit with an associated seal, and in some cases, is capable of being assembled by hand.

Still further, the centrifugal excluder lip of the invention is able to be incorporated as part of a unitized seal package, as well as being available for retrofitting, that is, adaption to an existing installation.

According to the invention, advantage may be taken of the centrifugal excluder or "slinger" effect, namely, the ability of a rotating member to exclude contaminants from a sealed region and to prevent their buildup by the action of centrifugal force, which force can also be used to regulate or moderate the axial end face load of the excluder lip.

In view of the failure of the prior art to provide an easily installable combination centrifugal excluder and wear sleeve adapted for cooperation with conventional oil seals, it is an object of the present invention to provide an improved centrifugal excluder assembly for use in sealed mechanisms.

Another object of the invention is to provide an improved, unitized or unitizable seal which includes a centrifugally acting excluder lip component.

A further object is to provide a fluid seal system which includes a dirt excluder which is adapted to act as a slinger or the like under the influence of centrifugal force, and to cooperate with an associated conventional seal, which seal may include its own dust or excluder lip.

A still further object of the invention is to provide an improved, unitized seal system whereby a plurality of similar but somewhat different parts may be made using the same tooling, with the result that a centrifugal excluder can be made in a variety of part sizes at minimum tooling costs.

Yet another object of the invention is to provide an excluder arrangement which is easily installed and removed from an associated shaft, and which is able to provide a wear sleeve for a conventional seal, and at the same time use a part of such conventional seal as a companion surface against which it exerts a sealing force.

A further object of the invention is to provide an improved seal unit which includes a conventional seal, mounted on its outer diameter and including a seal lip body positioned at its inner diameter on a radially extending flange, with the exterior surface of the radial flange acting as a companion surface against which an excluder lip may act in use to provide a dust seal.

A still further object of the invention is to provide an improved two component seal assembly including a combination oil seal and unitizing component having inner and outer cases, an oil seal having radial and axial flanges, and a centrifugally acting excluder unit which has an inside diameter adapted to be readily positioned over an associated shaft, an axially extending, generally cylindrical surface adapted to act as the wear surface or seal band engagement surface for the other component, and further including a radial flange having attached thereto an excluder seal adapted to engage a portion of the radial flange of the seal casing.

A still further object of the invention is to provide an excluder design having a lip which may advantageously be made from a variety of materials.

Yet another object of the invention is to provide an improved seal which operates by taking advantage of centrifugal force as well as a labyrinth construction to insure maintenance of a clean working environment for the seal.

Another object of the invention is to provide an improved seal assembly and method adapted for use in a number of applications.

A further object of the invention is to provide a combination wear sleeve and excluder seal which may be used in existing applications and which, when so used will add increased functionality to an existing seal installation.

A still further object of the invention is to provide a combination wear sleeve and excluder lip unit having axial and radial flanges and adapted for multiple purposes, and being capable of manufacture by assembled seal techniques, or by bonding, or both.

Yet another object of the invention is to provide a seal assembly which takes advantage of both elastomeric and metal materials to provide easy installation and wear sleeve characteristics without sacrificing flexibility and reliable operation in use.

The foregoing and other objects and advantages of the invention are achieved in practice by providing a combination seal unit having a combination wear sleeve and centrifugal excluder unit, with the wear sleeve having an elastomeric inner diameter portion adapted to be readily installed on a shaft forming a part of the sealed mechanism and an outer diameter adapted to act as a wear sleeve for an associated seal, with a radial flange on the excluder being also provided for locating a centrifugally acting excluder lip which in turn cooperates with the oil seal by engaging such seal on the radial flange thereof. The invention further achieves its objects by combining the foregoing units into a single assembly by means of a unitizing flange.

The manner in which the foregoing and other objects and advantages are achieved in practice will become more clearly apparent when reference is made to the following detailed description of the preferred embodiments of the invention set forth by way of example, and shown in the accompanying drawings, wherein like reference numbers indicate corresponding parts throughout.

BRIEF DESCRIPTION OF THE DRAWINGS

FIG. 3 is a fragmentary vertical sectional view, showing the manner in which the centrifugal excluder and the seal component of the invention may be installed over an associated shaft;

FIG. 4 is a view similar to FIG. 3, showing the parts in the assembled position;

FIG. 5 is a vertical sectional view of a modified, assembled form of excluder unit embodying the principles of the invention;

FIG. 6 is a vertical view of an assembled, unitized seal similar to FIG. 1, but shown without cross-hatching for clarity;

FIG. 7 is a sectional view, partly diagrammatic in character, showing the manner in which a centrifugal excluder unit may be made to accommodate a variety of applications; and FIG. 8 is a vertical sectional view illustrating certain operational aspects of the centrifugal excluder unit made according to the invention.

DESCRIPTION OF THE PREFERRED EMBODIMENTS OF THE INVENTION

While it will be understood that the seal assembly of the invention may be used in different applications, and may be used in different positions, a description of a preferred form thereof will be given wherein the sealed mechanism includes a machine housing, a counterbore, and a bearing journalling a rotary shaft; wherein the sealed medium is oil, and wherein the rotary part of the mechanism is the shaft and its associated excluder. In this connection, the expression "seal assembly" is used to refer to all of the components of the invention, which in turn are subdivided into a combination wear sleeve and centrifugal excluder, a unitizing component, and an oil seal unit, per se.

Figure 1:
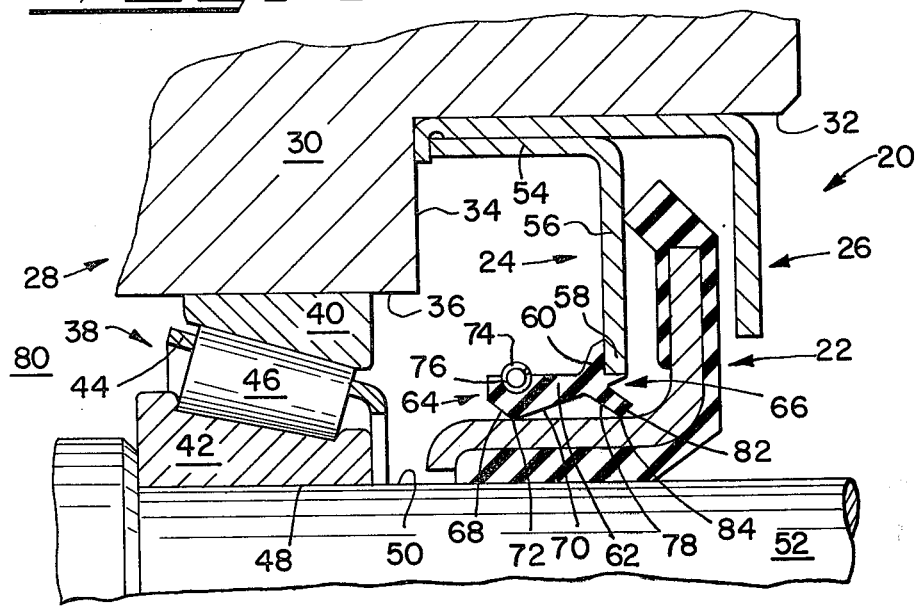
FIG. 1 is an enlarged vertical sectional view, showing a preferred form of fluid seal made according to the invention, and installed in place so as to form a part of a sealed mechanism.
Figure 2:
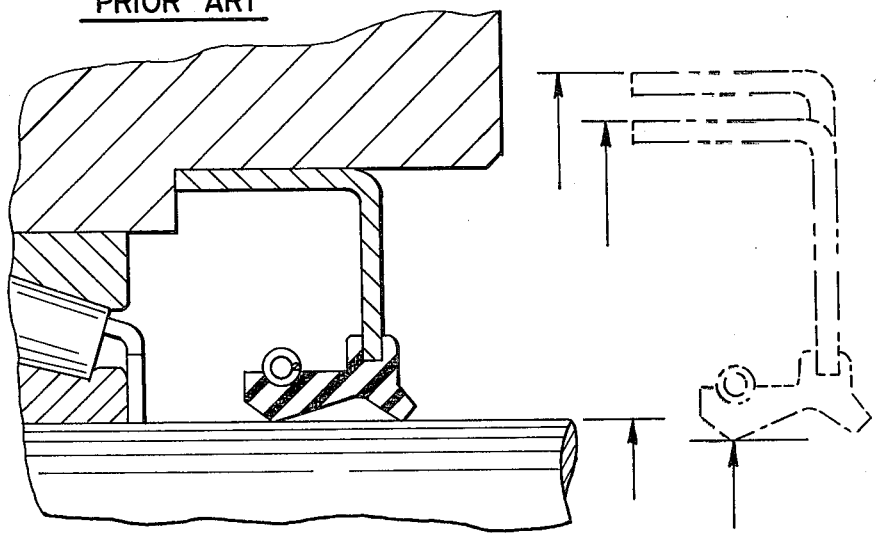
FIG. 2 is a vertical sectional view, showing a prior art oil seal.

Referring now to the drawings in greater detail, FIGS. 1 and 6 show the seal assembly of the invention, generally designated 20, to include three principal components, a combination wear sleeve and excluder component generally designated 22, an oil seal unit, generally designated 24, and a unitizing component, generally designated 26. These components are associated with a sealed mechanism generally designated 28 and shown to include a housing 30 having a counterbore 32 for receiving the entire seal assembly 20, the counterbore 32 terminating at a radially inwardly extending end wall 34, which at its inner diameter meets a bearing receiving bore 36 of reduced diameter. A bearing assembly generally designated 38 and shown to include an outer race 40, an inner race 42, a cage 44 and a plurality of tapered rollers 46 is shown, with the inside diameter 48 of the inner race 42 being received in snug relation over the outside diameter 50 of a rotary shaft 52. In use, the shaft rotates relative to the housing and may position an axle, a wheel, or perhaps may form a part of another component, such as a crankshaft or the like.

Referring now to the oil seal unit 24, this part is a conventional seal of the type having a casing comprising with an axially extending mounting flange 54, a radially inwardly extending flange 56, which terminate in a bonding portion 58 to which a heel portion 60 of an elastomeric seal lip body 62 is bonded. As shown, the seal lip body 62 includes a primary seal lip portion 64 and a secondary sealing lip portion 66, with the primary lips 64 being defined in part by an oil side frusto-conical surface 68 and an air side frusto-conical surface 70, which surfaces 68, 70 meet along a generally circular locus 72 to form a seal band.

A garter spring 74 is positioned in spring groove 76 in a known manner to provide a radial load for the seal to enhance its sealing effectiveness. The auxiliary or excluder lip body 66 includes a frusto-conical surface 78 facing inwardly and toward the sealed region, shown as 80 in FIG. 1, and at least one exteriorly facing surface 82, which cooperates with the surface 78 to form a secondary excluder seal band 84.

Referring particularly to FIG. 6, wherein cross-hatching is omitted for clarity, the construction of the combination wear sleeve and excluder 22 is shown to include a stamped metal casing portion 86 comprising an axial flange 88, a radial flange 90, and radiused portion 92. An elastomeric mounting sleeve 94 is bonded to the inner surface 96 of the flange 88, which terminates in an axially inner curl 98. The excluder 22 also includes a flexible excluder lip body 100 bonded to the radially outer margin 102 of the radial flange 90 of the casing 86; an elastomeric radial web 93 is bonded to the exterior surface 104 of the radial flange 90, and extends between the sleeve 94 and the lip 100. The cylindrical sleeve 94 acts as an elastomeric mounting body having an inner surface 106 which is adapted to be received over the outside diameter 50 of the shaft 52.

The excluder lip 100 is defined by an outermost frusto-conical surface 108, an intermediate frusto-conical surface 110, and innermost frusto-conical surface 112, with the surfaces 108-110 meeting along a generally circular locus 116, the latter forming, in cooperation with the radially extending flange 56 of the seal unit 24, an excluder seal whose properties will be further described herein.

Referring again to the axial flange 88 of the excluder 22, a radially outwardly directed surface 118 thereof serves as the companion surface against which the seal band 72 of the seal unit 24 acts.

In FIGS. 1 and 6, the entire seal assembly 20 is shown to include a unitizing element 26 which itself is a simple stamping having an axial mounting flange portion 120 with an outside diameter 122 for reception in the counterbore 32, a curl 124 on the axially inner end of the flange 120, serving to crimp the innermost margin 126 of the seal flange 54 in place. In addition, the unitizing element 26 includes a radial flange 126 having an innermost margin 128 spaced radially outwardly apart from the shaft 52, but serving to cover or shroud the excluder lip 100 when viewed axially, thereby providing a labyrinth seal for protection of the excluder lip 100 against larger size contaminant materials.

Referring now to FIG. 3, an alternate form of seal assembly 20a is shown, and this unit includes an excluder element generally designated 22a and a seal unit per se, 24a. This unit, which is shown exploded in FIG. 3 and assembled in FIG. 4 is the same as its counterpart in FIGS. 1 and 6, except the unitizing element 26 of the embodiment of FIG. 1 is absent therefrom. Specifically, the assembly 20a has the seal proper portion 24a which includes flanges 54a, 56a, and the seal body 62a having the various surfaces described above, including the seal band 72a. The seal unit 24a cooperates with the wear sleeve and excluder unit 22a; specifically, the seal band 72a engages the outer diameter 118a of the axial flange 88a. The excluder seal body 100a resembles its counterpart 100 in FIG. 1; its seal band 116a bears on an exterior surface 57a of the flange 56a. The other portions of the seal unit 22a, including the elastomeric mounting sleeve 94a are the same as or similar to their counterparts, and it also functions in the same manner in use.

FIG. 3 shows, in addition to the foregoing parts, that the dimensions of the various elements of the invention, including the outer diameter 52a of the shaft 52a in relation to the inner diameter 106a of the mounting portion 95a are selected so that the wear sleeve and excluder element 22a is a slight interference or press fit over the diameter 50a. Likewise, there is a desirable amount of so-called molded or residual interference between the seal band area 72a of the primary seal lip 62a and the exterior surface 118a of the annular flange 88a, so that there is snug engagement between the seal band 72a and the surface 118a.

Preferably, the fit between the seal band area 84a of the excluder lip portion of the seal body 62 is arranged so that there is a very slight interference fit, an exact fit, or a very slight clearance between the seal band 84a and the surface 118a. In all or almost all cases, it is known that the excluder lip portion of the seal 24a runs with less lubrication and therefore at a higher temperature than the primary seal band 72a, and accordingly this interference or tightness of fit is reduced or does not exist.

In the embodiment shown, it is customary to fit the seal 24a with respect to the wear sleeve and excluder unit, then insert the two as a unit respectively over the surface 52a and within the counterbore 32a. Obviously the reverse sequence would not be appropriate, as the seal 24a cannot be pushed axially over the enlarged diameter of the unit 22a as a whole.

Referring now to FIG. 5, an alternative embodiment of the invention is shown wherein a seal assembly generally designated 20b is shown to resemble that of its counterparts 20, 20a, except that the wear sleeve and excluder assembly 22b differs from its counterparts shown in FIGS. 1-4 and 6.

As shown in FIG. 5, the unit 22b includes an axial flange 88b acting as a wear sleeve and having an exterior surface 118b terminating in a curl 98b. The elastomeric mounting sleeve 94b also resembles its counterpart in the other examples, except that the web 93b extends only partially outwardly on the radial flange 90b. In this instance, the excluder lip 100b is a sheet of fluorocarbon or like lubricous material. In this instance, the fluorocarbon material is in the form of a contoured annular disc, including a seal band area 116a formed where a pair of frusto-conical surfaces 110b and 112b meet. The lip thus formed acts on the exteriorly directed surface 57b of the radial flange 56b of the seal 24b, only part of which is shown for clarity. The principal difference between the embodiment of FIG. 5 and that of FIGS. 1-4 and 6 is that the fluorocarbon ring 100b is pinched or crimped between an axially inner surface 101b of the flange 90b and an axially outwardly directed surface 103b of the flange 105b formed on the casing 107b. As shown, the casing 107b may be assembled with its radially inner surface 109b tightly press fit over the surface 118b and then forced into the position shown, crimping or clamping the member 100b between the opposed surfaces 101b, 103b.

Assembly of the seal thus comprises steps of forming the fluorocarbon or like washer into the dished form shown, placing it in centered relation over the casing 86b, such that it rests on the surface 101b. Thereafter, the unit 107b is forced axially toward the flange and over the surface 118b until the fluorocarbon material is held firmly in place. As is well known to those skilled in the art, additional gasketing or secondary sealing may be provided; however, this is not considered generally necessary where the lip body 100b merely acts as an excluder and is not intended to seal measurable quantities of low viscosity liquid.

Referring now to FIG. 7, it is shown that, in the wear sleeve and excluder assembly 22c, the length of the elastomeric sleeve 94c and that of its associated axial flange 88c may differ, depending upon the depth and other design parameters of the seal with which it is associated in use. Dimension (A) applies to a seal assembly which has relatively reduced axial dimension while dimension (B) shows that the flange 88b and its associated sleeve 94b may be considerably larger, particularly if the seal to be accommodated is a multiple lip seal or the like requiring flange 88c to present a wear surface 118c of substantial axial extent. In other respects, including the provision of the seal lip 100c, the unit 22c is the same as its counterpart in FIGS. 1-4 and 6.

Referring now to FIG. 8, it is assumed that a similar seal generally designated 20d is provided which includes a seal unit, per se, generally designated 24d and shown only in part, and that this unit in turn cooperates with the unit 22d which is likewise shown only in part. As shown in the solid line in FIG. 8, the seal lip body is made from an elastomer and has its body portion inclined toward the surface 57d to be sealed against when the lip is formed (see the configuration of FIG. 6, for example). When installed, as shown in the solid lines, the surface 112d is slightly bowed and a seal band 116d is formed against the surface 57d. The other frusto-conical surface 110b is shown as having a given diameter.

As is also shown in FIG. 8, once rotation of the shaft occurs, as shown by the arrow designated "R", the measurable shaft speed is achieved, centrifugal force acts on the body 100d, tending to move it radially outwardly because of centrifugal force as shown by the arrow marked "F". This also creates an axial component shown as "X" by the other arrow in FIG. 8, and serves the purpose not only of narrowing the cross section of the body 100d, but also of moving the locus of the seal band 116d slightly outwardly as shown in the dotted line location. Thus, the elastomeric seal lip body 100d deforms slightly in use, moving so as to reduce its own axial thickness, to elongate its body in the direction of centrifugal force, and also to withdraw a portion of the body somewhat axially outwardly as the effective sealing diameter increases. Under these conditions, the seal lip produces a reduced axial end face load with higher speed operation.

As will be noted by reference to FIGS. 1, 6 and 8, whereas the lip body 100d, as well as the counterparts in the other figures, are subjected to deformation under the influence of centrifugal force, the body 62 of the seal 24a does not undergo deformation because it is associated with a stationary part. Consequently, a unique excluder action can be developed which may be made to operate independently of the primary sealing lip action or the action of the primary and secondary lips of the composite metal and elastomeric seal assembly 24, for example. The combination of providing a wear sleeve for a conventional seal, together with an easily installed seal having a centrifugally acted upon excluder unit provides a number of advantages in use. For example, in an existing installation, the assembly 22a may be installed where an all metal wear sleeve would formerly have been used, and a suitably sized replacement seal may be used, such seal having an enlarged inside diameter, but the same outside diameter. In addition to the wear sleeve, however, the seal of the invention provides a labyrinth, an auxiliary seal which may be made from the same or different material as that of the primary seal lip body, and a rubber or other suitably flexible material forming its inside diameter to provide a snug secondary seal as well as to afford ease of installation and positioning. Seals of the present invention are very suitable for pre-installation maintenance, such as greasing the primary lip, the auxiliary lip and the inter-lip area of the seal.

The ease of construction and the unitizing feature not only make pre-assembly and shipment of the seal unit easier but the provision of a wear sleeve in the same package as the seal itself means that a single manufacturer can assume responsibility for seal performance. In other words, the same manufacturer who makes the seal also makes the wear element, unlike the feature wherein one manufacturer makes the seal and another manufacturer makes the shaft. Consequently, a manufacturer has an improved ability to fit the sleeve to the seal. By providing a wear sleeve with a rubber inside diameter surface, it is possible to make rubber mounting sleeves of differing thicknesses and thus keep a single set of stampings as wear sleeves, while merely using a slightly different sized mold plate to make differing sized inside diameters.

The advantages of a centrifugal excluder or slinger have already been discussed. The invention enables a radial exterior surface of the seal unit, per se, to act as a wear surface, and consequently, each seal part has a lip which acts against an associated surface of the other part.

The sleeve concept is such that the excluder lip itself may be formed by crimping or by bonding. Because the excluder lip is actually an axially acting end face seal, concentricity of the excluder lip with the sleeve is not particularly critical. It will be appreciated that the invention provides a combination of radially and axially acting seals, with one of the lips being also subject to a centrifugal action.

The materials used in manufacturing the seal of the invention are not particularly critical; the casings are usually steel stampings but can be aluminum, brass or the like. The rubber materials and usually nitrile materials, but may be natural rubber fluoroelastomers carboxylated nitrles, hydrin rubbers, silicone rubbers, or the like. The excluder lip may also comprise a fluorocarbon resin which is lubricous and somewhat stiff, but resilient. These materials usually comprise a polymer of tetrafluoroethylene (TFE) filled with glass fibers, carbon or other materials. The inner diameter surface of the rubber mounting sleeve is shown as being smooth, but it will be understood that it may be ribber or otherwith contoured if indicated.

It will thus be seen that the present invention provides a new and improved fluid seal having a number of advantages and characteristics, including those referred to herein and others which are inherent in the invention. Several preferred embodiments of the invention having been described by way of illustration, it will occur to those skilled in the art that changes and variations to the illustrated embodiments may be made without departing from the spirit of the invention and the scope of the appended claims.

I claim:

1. An oil seal assembly comprising a seal unit having a seal mounting flange portion, a radial flange portion, and a primary seal lip body bonded to a part of said radial flange, said seal lip body having oil and air side frusto-conical surfaces meeting to define a primary seal band, said radial flange also including an exterior surface portion adapted to engage and cooperate with an excluder lip to form an end face seal for protecting said primary seal lip against contamination, and an excluder unit comprising an annular casing with an axial flange having radially inner and outer surfaces and a radial flange portion, an elastomeric casing positioning sleeve having its outer diameter bonded to aid radially inwardly directed portion of said excluder component axial flange and its inner diameter adapted to be received in a snug but removable sealing engagement over an associated shaft, said excluder casing having its radially outwardly directed surface adapted to engage said seal band on said primary sealing lip body in snug sealing engagement, said excluder further including an excluder lip extending generally radially outwardly of said excluder casing and axially toward said exterior surface portion of said radial flange of said sealing unit, so as to engage said exterior surface in said face sealing engagement, with said excluder lip being adapted to contact said exterior surface with a first force in a static condition, and to deflect axially partially away from said exterior surface under an applied centrifugal force so as to reduce said first force on said exterior surface to a force of reduced value.

2. A seal unit as defined in claim 1 wherein said excluder lip comprises an elastomeric lip body bonded to an outer margin of said radial flange of said excluder casing.

3. A seal unit as defined in claim 1 wherein said primary lip body further includes an auxiliary lip formed as an integral part of said primary lip body, said auxiliary lip having a seal band adapted to engage said outwardly directed surface of said excluder casing axial flange.

4. A seal assembly as defined in claim 1 wherein said seal unit further includes an outer casing overlying and secured to said mounting flange portion of said seal unit, said outer casing having a radial flange extending radially inwardly so as to cover said radial flange portion of said excluder casing at least in part, said radial flange of said excluder casing being located axially between said exterior surface of said seal unit radial flange and said radial flange of said outer casing.

5. A seal assembly as defined in claim 1 wherein said seal unit further includes an outer casing overlying and secured to said mounting flange portion of said seal unit, said outer casing having a radial flange extending radially inwardly so as to cover said radial flange portion of said excluder casing at least in part, said radial flange of said excluder casing being located axially between said exterior surface of said seal unit radial flange and said radial flange of said outer casing.

6. An oil seal assembly as defined in claim 2 wherein said elastomeric excluder lip body is joined to said elastomeric casing portion by an annular web of elastomer extending radially along the axial exterior surface of said excluder casing radial flange.

7. An oil seal assembly as defined in claim 1 wherein said excluder lip comprises a pre-formed ring of a lubricous material having an outer margin thereof engaging said exterior surface of said radial flange of said seal unit and having its inner margin clamped in place between an axial inner surface of said excluder casing radial flange and a locking flange secured over said outwardly directed surface of said excluder axial flange.

8. An oil seal assembly as defined in claim 7 wherein said excluder lip ring comprises a fluorocarbon polymer.

9. An oil seal assembly as defined in claim 7 wherein said primary seal lip body further includes an auxiliary lip having a seal band adapted to engage a portion of said exlucder casing.

* * * * *